Jan. 28, 1930. W. A. WALLACE ET AL 1,745,069
TRACTOR HITCH AND CONTROL APPARATUS
Filed Nov. 10, 1923 2 Sheets-Sheet 2
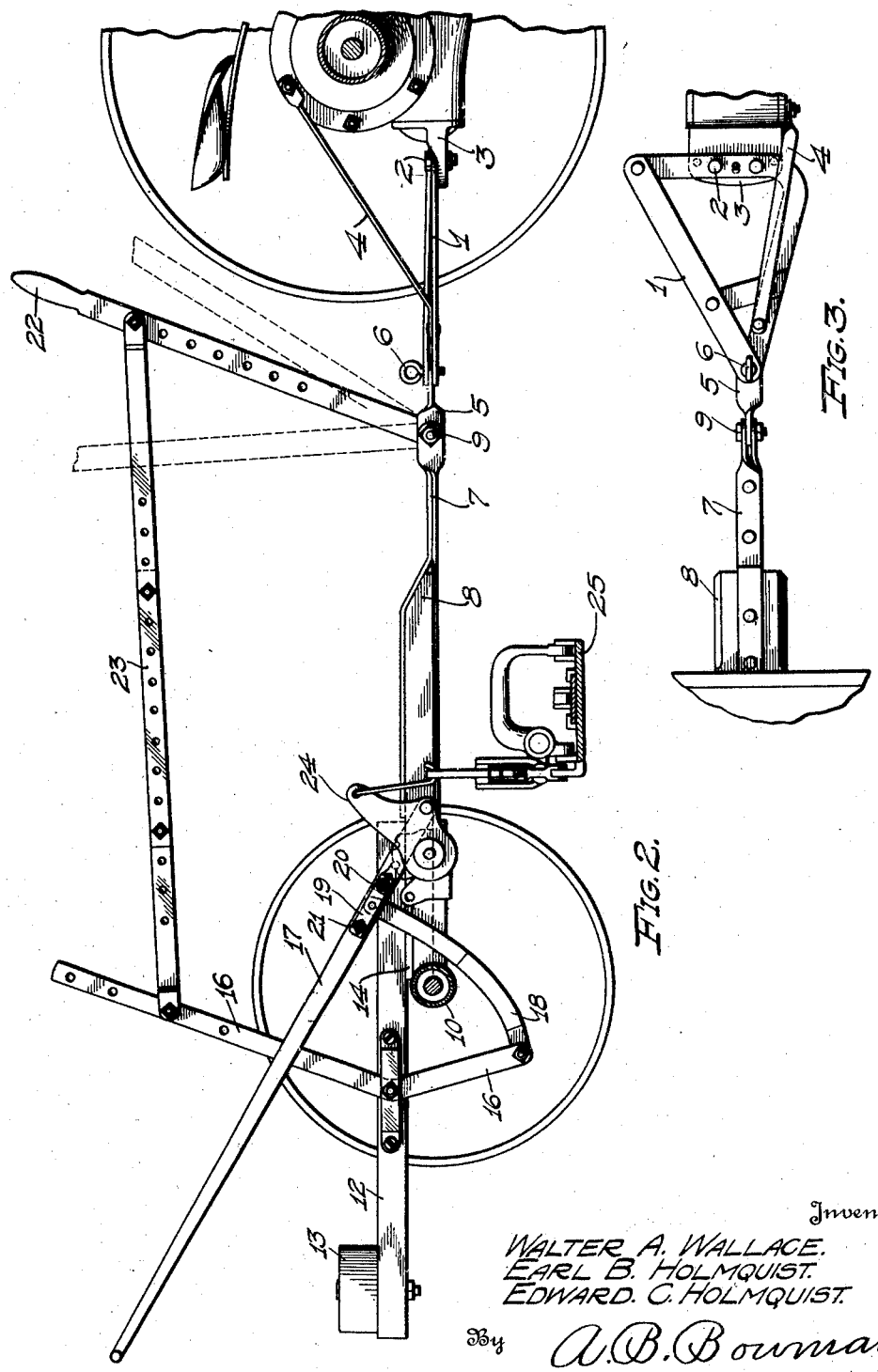
Inventors
WALTER A. WALLACE.
EARL B. HOLMQUIST.
EDWARD. C. HOLMQUIST.
By A.B.Bowman
Attorney Patented Jan. 28, 1930

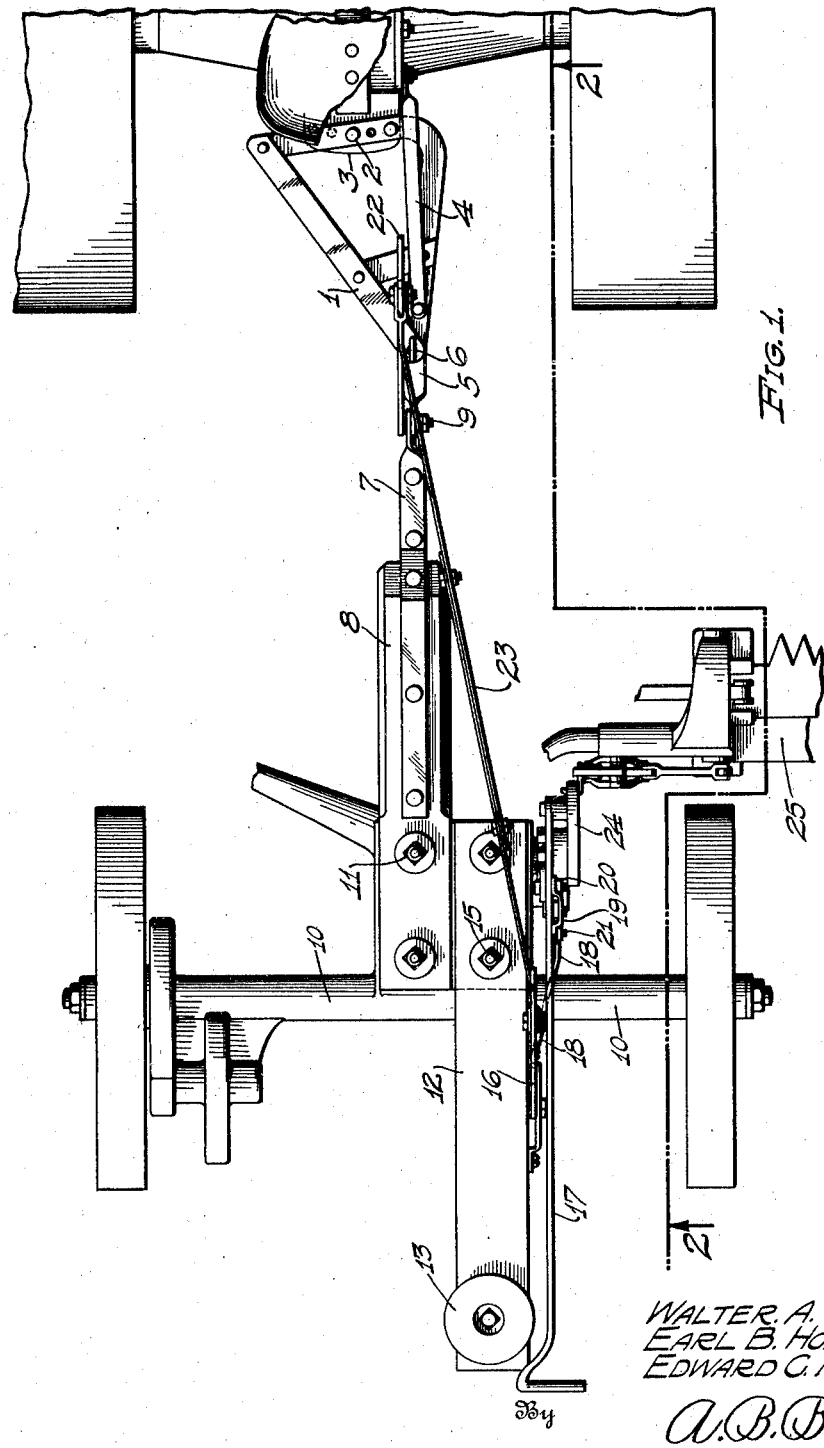

1,745,069

UNITED STATES PATENT OFFICE

WALTER A. WALLACE, EARL B. HOLMQUIST, AND EDWARD C. HOLMQUIST, OF CALIPATRIA, CALIFORNIA; SAID EARL B. HOLMQUIST AND SAID EDWARD C. HOLMQUIST ASSIGNORS OF ONE-TWELFTH OF THEIR RIGHT TO SAID WALLACE

TRACTOR HITCH AND CONTROL APPARATUS

Application filed November 10, 1923. Serial No. 673,906.

Our invention relates to a tractor hitch and control apparatus for connecting a trailer or farm implement to a tractor or other vehicle, and the objects of our invention are: First, to provide an apparatus of this class by means of which a trailer or farm implement may be connected to a tractor or other vehicle in such a manner that the trailer or implement will follow the tractor or vehicle to one side thereof; second, to provide an apparatus of this class by means of which the trailer or implement may be closely connected to the tractor so that a sharp turn may be readily made by the former; third, to provide an apparatus of this class for connecting an agricultural implement to a tractor by means of which the implement may be readily operated from the driver's seat of the tractor; fourth, to provide such an apparatus by means of which the cuter-bar of the mower may be easily raised and lowered, as desired, from the driver's seat of the tractor; fifth, to provide a novelly constructed and arranged apparatus of this class, and sixth, to provide an apparatus for connecting a trailer or agricultural implement to a tractor which is very simple and economical of construction, durable, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a plan view of our apparatus connected at one end with the draw-bar member of a tractor, and at its other end with the draft portion and operating mechanism of a mower, showing the tractor and mower fragmentarily; Fig. 2 is a side elevational view thereof, showing certain parts and portions broken away and in section to facilitate the illustration with the view taken at 2—2 of Fig. 1, and Fig. 3 is a plan view of our hitch apparatus, showing the same connecting a trailer with the draw-bar member of a tractor.

Like characters of reference refer to similar parts and portions throughout the several views of the drawings.

The hitch member 1, bolts 2, tractor drawbar member 3, brace 4, connecting link member 5, eyebolt 6, draft members 7 and 8, bolt 9, mower frame 10, bolts 11, weight support 12, weight 13, spacing block 14, bolts 15, lever 16, cutter-bar raising lever 17, link 18, link securing members 19, bolts 20 and 21, operating lever 22, adjustable connecting member 23, cutter-bar raising member 24, and the cutter-bar 25, constitute the principal parts and portions of our hitch apparatus.

The hitch member 1 consists of a triangularly shaped frame positioned with one of its side members continguous to the drawbar member 3 of a tractor, said side member being provided with a plurality of spaced holes corresponding with the holes in the draw-bar member, and is secured thereto by means of bolts 2 extending through a pair of said holes. It will be here noted that the holes in the draw-bar member are preferably arranged in an arc of a circle, as in the drawbar member of certain tractors now in use known as Fordson tractors, which permits the opposite vertex of the triangularly shaped hitch member to be shifted to one side or the other relatively to the tractor as desired. The hitch member 1 is preferably provided with a brace 4, which is adapted to be secured at its opposite end to the differential casing of the tractor, substantially as shown in Fig. 2 of the drawings. A connecting link member 5 is pivotally connected at its one end to the hitch member 1 at said vertex by means of an eyebolt 6, which eyebolt may be readily removed for disconnecting said members. Said connecting member 5 is pivotally connected at its opposite end with the forwardly extending ends of the straps 7 by means of the bolt 9, the straps 7 being secured to the upper and lower sides of the wooden draft member 8 for reinforcing and extending the same. It will be noted that the pivotal connections between the members 5 and 7 are at a right angle with the pivotal connection between the member 1 and the member 5, thus providing a universal joint between the tractor and the mower adapted to be connected therewith. The draft member 8 is secured to the frame 10 of the mower by means of bolts 11. The mower shown in the drawings is a McCormick No. 6, but it will be noted that our hitch and control apparatus is not limited to this particular type of mower. It will also be here noted that the forwardly extending portion of the frame to which the draft member 8 is conventionally secured is so constructed that the draft member may be secured to substantially the middle portion thereof or to one side, the position of the draft member in Fig. 1 being substantially in the middle portion of the frame. A weight support 12 is positioned to one side of the draft member 8 and secured to the side portion of the forwardly extending portion of the frame by means of the bolts 15, there being positioned between the bottom of the recess of said forwardly extending portion and the weight support 12 a spacing block 14 to raise the same above the axle portion of the frame. The weight support 12 extends a considerable distance backwardly from said frame and is provided at its backwardly extended end with a weight 13, which is adapted to counterbalance the mower in place of the operator when the same is connected with a tractor, under which conditions the services of an operator on the mower are eliminated. On one side of the weight support 12 is pivotally mounted a lever 16, which extends upwardly and downwardly from its pivotal mounting, the lower end being pivotally connected by means of a curved link 18 with the manually operated cutter-bar raising lever 17 of the mower. The end of the link 18, connected with the lever 17, is pivotally connected to the bridged securing member 19, which is secured to the lever 17 by means of the bolts 20 and 21, the former bolt 20 being also adapted to secure the conventional cutter-bar positioning cam pawl to said lever. The link 18 is curved, as shown in the drawings, to clear the axle housing of the power, and is also preferably offset to clear the pivotal support for the conventional foot lever of the mower for operating the cutter-bar. The operating lever 22, which is pivotally mounted at its one end on the bolt 9 connecting the members 5 and 7, is so positioned that the same is conveniently operable from the driver's seat of the tractor. Said operating lever 22 is pivotally connected intermediate its ends, by means of the adjustable link 23, with the upwardly extending portion of the lever 16, said levers 16 and 22, as well as the link 23, being provided with a plurality of holes so that the same may be readily adjusted as desired for different mowers or other implements. The fixed end of the cutter-bar raising lever 17 is secured to the cutter-bar raising member 24, which is pivotally mounted on the forwardly extending portion of the frame 10. Said raising member 24 is connected by means of a plurality of links and levers with the cutter-bar 25, as shown in Figs. 1 and 2 of the drawings.

It will be noted that by pulling the operating lever 22 forwardly the lever 17 is forced downwardly, raising the cutter-bar, and by forcing the lever 22 backwardly the cutter-bar is again lowered, it being noted that the cam pawl, previously mentioned and adapted to hold the lever 17 in position when the cutter-bar is raised to certain positions, is automatically released when the lever 22 is forced backwardly.

It is obvious from this construction, as illustrated in the drawings and described in the foregoing specification, that there is provided a hitch and control apparatus as aimed at and set forth in the objects of the invention, and though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent, is:

1. The combination with a conventional mower having a single pair of wheels, a cutter bar raising lever, and a cutter bar positioned forward of the wheel axle of means for controlling said mower from the seat of a tractor, including a draft member secured to said mower, a counter balance weight support secured to the frame of the mower contiguous to the draft member thereof and extending rearwardly of the wheel axis, a lever pivotally mounted on said support and connected with the cutter bar raising lever of said mower and an operating lever pivotally mounted near the forward end of the draft member and operatively connected with said first lever.

2. The combination with a conventional mower having a single pair of wheels, a cutter bar raising lever, and a cutter bar positioned forward of the wheel axle, of means for controlling said mower from the seat of a tractor, including a draft member secured to said mower, a counter balance weight support secured to the frame of the mower contiguous to the draft member thereof and extending rearwardly of the wheel axis, a lever pivotally mounted intermediate its ends on said support and connected at its lower end with said cutter bar raising lever, and an operating lever operable from said tractor connected intermediate its ends to the upper end of said first mentioned lever.

3. In a hitch and control apparatus, the combination with a tractor and mowing machine including a manual cutter-bar raising member, of a hitch means connected with said mower and adapted to be variously connected with said tractor, an operating lever positioned in close proximity to said tractor; a link member connected at its one end to the manual cutter-bar raising lever and at its other end connectible at various radii to said operating lever.

4. In a hitch and control apparatus, the combination with a tractor and a mower including conventional operating mechanism, of a hitch means detachably connecting said mower with said tractor, a support secured to and extending backwardly from the frame of said mower, a counterbalance weight secured to the extended end of said support, and a lever means mounted on said hitch means and said support, operable from said tractor and connected with the operating mechanism of said mower by means of a link member, one end thereof being connectible at various radii to said lever means.

5. In a hitch and control apparatus, the combination with a tractor and a mower, of a hitch means connecting said mower with said tractor, a lever pivotally mounted intermediate its end and in close proximity to said tractor, a link extending underneath the wheel axle and connecting the lower end of said lever with the manual cutter-bar raising lever of said mower, an operating lever pivotally mounted at its one end behind the main portion of said tractor, and a link connectible at its one end at various radii to said operating lever and at its other end to said first mentioned lever near the upper end thereof.

6. In a hitch and control apparatus, the combination with a tractor and a mower including conventional frame, wheel axle and manual cutter bar raising lever, of a hitch means connecting said mower with said tractor, a support secured to and extending backwardly from the frame of said mower, a lever pivotally mounted intermediate its ends on said support, a link connecting the lower end of said lever with the manual cutter-bar raising lever of said mower, an operating lever pivotally mounted at one one end on said hitch means, and a link connecting said operating lever with said first mentioned lever near the opposite end thereof.

In testimony whereof, we have hereunto set our hands at Calipatria, California, this 29 day of October, 1923.

WALTER A. WALLACE.
EARL B. HOLMQUIST.
EDWARD C. HOLMQUIST.